(12) United States Patent
Okabe et al.

(10) Patent No.: US 8,491,276 B2
(45) Date of Patent: Jul. 23, 2013

(54) PUMP (75) Inventors: Kaku Okabe, Wako (JP); Asagi Miwa, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 307 days.

(21) Appl. No.: 13/111,445

(22) Filed: May 19, 2011

(65) Prior Publication Data

US 2012/0020816 A1  Jan. 26, 2012

(30) Foreign Application Priority Data

Jul. 23, 2010 (JP) ................. 2010-166090

(51) Int. Cl.
*F04B 23/00* (2006.01)
*B01D 3/10* (2006.01)

(52) U.S. Cl.
USPC ............... 417/313; 417/234; 203/11; 203/91; 202/205

(58) Field of Classification Search
USPC ............ 417/234, 313; 202/205; 203/10, 203/11, 91
See application file for complete search history.

(56) References Cited

U.S. PATENT DOCUMENTS

| 4,243,526 | A | * | 1/1981 | Ransmark | 203/10 |
| 4,276,124 | A | * | 6/1981 | Mock | 202/236 |
| 6,189,811 | B1 | * | 2/2001 | Rudy | 239/375 |
| 6,200,428 | B1 | * | 3/2001 | VanKouwenberg | 202/160 |
| 7,398,747 | B2 | * | 7/2008 | Onodera et al. | 123/41.65 |
| 7,413,634 | B1 | * | 8/2008 | Napier | 202/153 |
| 8,097,128 | B1 | * | 1/2012 | Sherry | 203/11 |
| 2007/0007120 | A1 | * | 1/2007 | Taylor | 203/1 |
| 2011/0280705 | A1 | * | 11/2011 | England et al. | 415/1 |

FOREIGN PATENT DOCUMENTS

| CN | 2454358 Y | 10/2001 |
| CN | 2556395 Y | 6/2003 |
| JP | 4139597 B2 | 8/2008 |
| JP | 2009-264317 A | 11/2009 |
| WO | 01/72638 A1 | 10/2001 |

OTHER PUBLICATIONS

Chinese Office Action dated Dec. 20, 2012, issued in corresponding Chinese Patent Application No. 201110167407.X (6 pages).

* cited by examiner

*Primary Examiner* — Charles Freay
(74) *Attorney, Agent, or Firm* — Westerman, Hattori, Daniels & Adrian, LLP (57) ABSTRACT

A pump includes: a branch pipe extending from a pump body for branching a part of raw water introduced from outside through a raw water inlet; a first tank having an exhaust pipe of an engine accommodated therein, the raw water supplied via the branch pipe being evaporated by heat of the exhaust pipe; a second tank provided over the first tank and having the branch pipe accommodated therein, vapor produced by evaporation of the raw water in the first tank being condensed into water droplets in the second tank; and a communication pipe interconnecting the first and second tanks in communication with each other.

8 Claims, 10 Drawing Sheets

PUMP

FIELD OF THE INVENTION

The present invention relates to engine-driven portable pumps for pumping up raw water from a river or the like to irrigate a field.

BACKGROUND OF THE INVENTION

Pumps are known which include: a motor as a drive source; rotary vanes connected to the output shaft of the motor; a pump chamber accommodating the rotary vanes; a lid member covering the pump chamber; a water inlet (i.e., raw water inlet) provided in one side of the pump chamber for introducing raw water from outside; a water outlet (i.e., raw water ejection outlet) provided in another side of the pump chamber for discharging the raw water from the pump chamber; and a draining plate provided on a motor-side end portion of the output shaft. One example of such pumps is disclosed in Japanese Patent Application Laid-Open Publication No. 2009-264317 (hereinafter referred to as "patent literature 1"), which is designed to effectively prevent water from entering the motor via the output shaft.

Also known today are techniques and apparatus for purifying water pumped up by such a pump. The known purification apparatus generally includes: an evaporation device for producing vapor from raw water by heating the raw water with heat provided by a heat source (heat exchanger); a condenser for receiving the produced vapor from an evaporator provided at the last stage of the evaporation apparatus and condensing the received vapor into distilled water; and an vacuum device for reducing the pressure of air within the evaporator of the evaporation device below the atmospheric pressure. One example of such purification apparatus is disclosed in Japanese Patent No. 4139597 (hereinafter referred to as "patent literature 2"), which is designed to permit efficient use of heat by using heat of the vapor and condensed water as a heat source of the heat exchanger.

However, the pump disclosed in patent literature 1 above only has a pump function capable of introducing raw water into the pump chamber and transferring the raw water from the pump chamber to another place, and the purification apparatus disclosed in patent literature 2 above only has a purification function capable of refining raw water into distilled water.

Water consumption in the whole world has been increasing year by year, and it is said that about two-thirds of the world population will be troubled with water shortage in the year of 2025. Even today, about 1.1 billion people in the world are unable to obtain safe drinking water. Further, in developing countries, poisoning and diarrhea resulting from drinking unboiled water from contaminated soil is occurring as an everyday affair. There have also been reports that infections resulting from such water and unsanitary daily life water are the most primary causes of death and about 80% of diseases in the world. Thus, securement of sanitary water is an urgent need. Namely, there is a demand for a hybrid water pump having both a pump function and purification (or distillation) function.

SUMMARY OF THE INVENTION

In view of the foregoing prior art problems, it is an object of the present invention to provide an improved pump which can not only supply or irrigate water from a river or the like to a field but also refine drinking water, which can readily provide safe drinking water even in a developing country where drinking water is difficult to obtain. The present invention also seeks to provide an improved pump which can readily provide drinking water even at the time of a disaster.

In order to accomplish the above-mentioned objects, the present invention provides an improved pump including an engine as a drive source, a pump body to be driven by the engine, a raw water inlet provided in the pump body for introducing raw water from outside, and a raw water ejection outlet provided in the pump body for ejecting raw water, which comprises: a branch pipe extending from the pump body for branching a part of the raw water introduced through the raw water inlet; a first tank having an exhaust pipe of the engine accommodated therein, the raw water supplied via the branch pipe being evaporated by heat of the exhaust pipe in the first tank; a second tank disposed over the first tank and having the branch pipe accommodated therein, vapor produced by evaporation of the raw water in the first tank being condensed into water droplets in the second tank; and a communication pipe interconnecting the first and second tanks in communication with each other.

In the pump of the present invention, a part of raw water is supplied to the first tank via the branch pipe and then evaporated by heat of the exhaust pipe. The resulting vapor is supplied from the first tank to the second tank via the communication pipe and brought into contact with the branch pipe to be cooled and condensed into water droplets, and the water droplets are accumulated in the second tank. In the aforementioned manner, the pump of the present invention can produce purified drinking water simultaneously with supplying or irrigating water from a river or the like to a field. As a result, the pump can readily provide safe drinking water even in a developing country where drinking water is difficult to obtain. Further, at the time of a disaster (particularly, natural disaster), the pump can readily provide drinking water.

Preferably, the pump of the present invention further comprises a cooling fin provided within the communication pipe for converting the vapor, produced in the first tank, back into water droplets. With this arrangement, it is possible to control an amount of vapor to be produced in the first tank.

Preferably, the pump of the present invention further comprises a vacuum pump provided on the pump body for reducing pressure (i.e., depressurizing the interior) of the first tank. Thus, the boiling point of water can be lowered by depressurizing the interior of the first tank. Thus, even when the exhaust pipe as a heat source has not warmed up sufficiently, e.g. at the time of activation of the engine, the pump can convert raw water into vapor. As a result, it is possible to achieve an enhanced convenience of the pump having a distillation function.

Preferably, the vacuum pump is driven by the engine. Thus, no separate drive source is required for driving the vacuum pump. Thus, the pump can be reduced in size and weight and hence in cost.

Preferably, the exhaust pipe is accommodated folded (i.e., accommodated in a folded configuration) in the first tank. Thus, it is possible to enhance the capability of the exhaust pipe as the heat source for promoting evaporation of raw water.

Preferably, the branch pipe is accommodated folded (i.e., accommodated in a folded configuration) in the second tank. Thus, it is possible to enhance the capability of the branch pipe as a cooling means for condensing vapor produced in the first tank.

Preferably, the pump body is supported by a pump frame, and a carrying handle and casters that permit carrying of the pump are provided on the machine body. Thus, the pump can be readily transferred or carried together with drinking water. As a result, it is possible to achieve an even further enhanced convenience of the pump having a distillation function.

Preferably, wherein the carrying handle is collapsible toward the pump body. Thus, the pump itself can be stored compactly and efficiently, and the pump can be readily loaded onto a vehicle or the like.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

As shown in FIGS. 1 to 4, an embodiment of a pump (water pump) 10 of the present invention includes: an engine 21 as a drive source; a pump body 22 to be driven by the engine 21; a branch pipe 23 extending from the pump body 22 to branch a part of raw water; a first tank 25 which has an exhaust pipe 24 of the engine 21 accommodated therein and to which is supplied a part of raw water so that the supplied water is evaporated by heat of the exhaust pipe 24; a second tank 26 which is disposed immediately over the first tank 25, has the branch pipe 23 accommodated therein and condenses vapor, produced in the first tank 25, into water droplets; and a pump frame 28 supporting the pump body 22 and first and second tanks 25 and 26.

Figure 5:
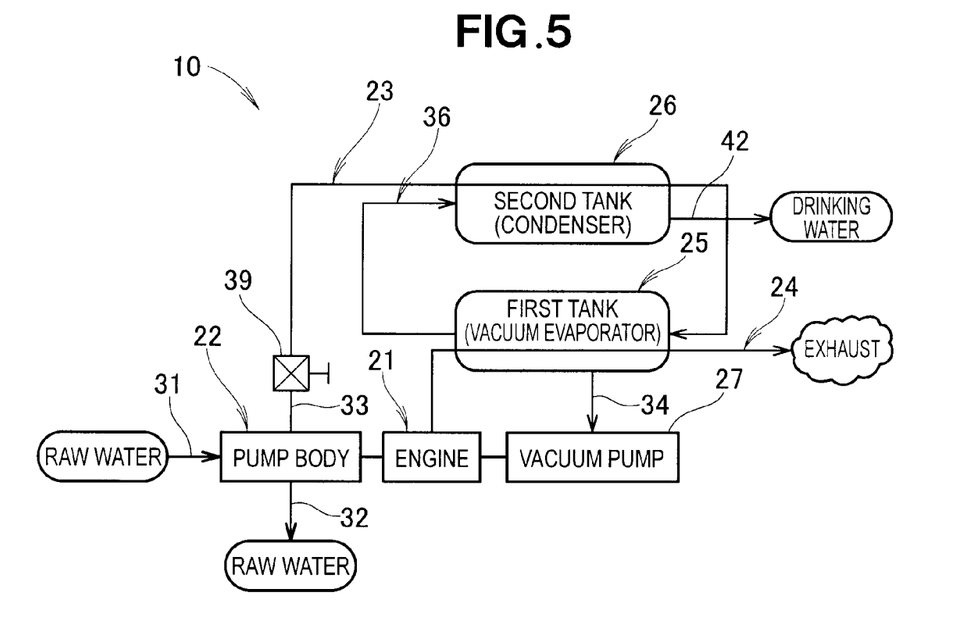
FIG. 5 is a block diagram of the pump of FIG. 1.

The pump body 22 includes a raw water inlet 31 to which is connectable a water supply hose 73 (FIG. 8) for taking in or introducing raw water from outside, a raw water ejection outlet 32 to which is connectable a raw water discharge hose 74 (FIG. 8) for ejecting raw water, and a branch port 33 to which is connected the branch pipe 23. Also, to the pump body 22 is connected a vacuum pump 27 to be driven by the engine 21 for reducing pressure within (i.e., depressurizing the interior of) the first tank 25. The vacuum pump 27 is connected to the first tank 25 via a connection pipe 34 (FIGS. 5 and 6).

Figure 6:
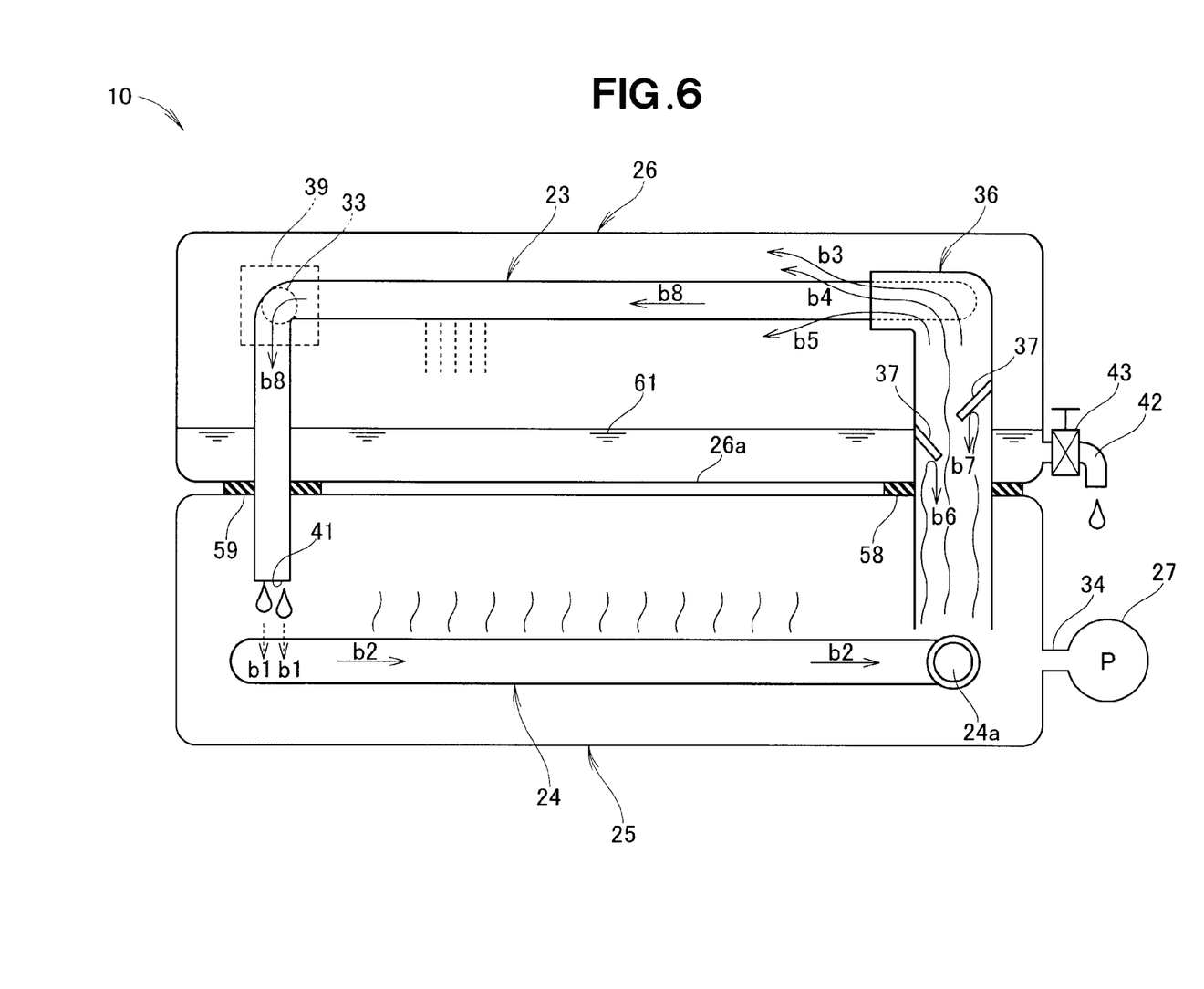
FIG. 6 is a view explanatory of basic principles of the pump of FIG. 1.

As shown in FIG. 6, the first and second tanks 25 and 26 are interconnected in communication with each other via a communication pipe 36. Within the communication pipe 36 are provided two cooling fins 37 for converting vapor, produced in the first tank 25, back into water droplets.

A flow rate adjusting valve 39 for adjusting a flow rate of raw water is provided on an end portion of the branch pipe 23 adjacent to the pump body 22, and a raw water supply opening 41 is provided at the distal end of the branch pipe 23. The raw water supply opening 41 opens to the interior of the first tank 25 for supplying raw water toward the outer periphery of the exhaust pipe 24. Further, the branch pipe 23 is accommodated folded (i.e., in a folded configuration) in the second tank 26.

A packing member 58 is provided between the first and second tanks 25 and 26 and around the communication pipe 36 to seal the first and second tanks 25 and 26 and communication pipe 36. Further, a packing member 59 is provided between the first and second tanks 25 and 26 and around the branch pipe 23 to seal the first and second tanks 25 and 26 and branch pipe 23.

The first tank 25 is depressurized by a vacuum pump 27. Namely, the first tank 25 functions as a vacuum vaporizer that vaporizes raw water supplied via the branch pipe 23. The second tank 26 cools the vapor by the branch pipe 23 where raw water flows. Namely, the second tank 26 functions as a condenser that condenses vapor into water droplets.

The second tank 26 is also designed to store distilled water 61 obtained by the vapor being condensed into water droplets via the branch pipe 23 in the first tank 25. Distilled water outlet (i.e., drinking water outlet) 42 for outputting the distilled water 61 is provided at one end of the second tank 26, and a water faucet 43 is provided on the distilled water outlet 42.

Further, the second tank 26 is formed of a transparent material so that distilled water 61 being produced can be viewed and a moist feeling can be imparted. Because the first and second tanks 25 and 26 are interconnected in communication with each other via the communication pipe 36, the first tank 25 is depressurized as the second tank 26 is depressurized.

The pump frame 28 includes: a frame section 45 supporting the engine 21, pump body 22 and first and second tanks 25 and 26; leg portions 49 provided on a lower end portion of the frame section 45; a cover 46 covering the engine 21, pump body 22 and first tank 25; and a carrying handle 47 and casters (wheels) 48 provided on the frame section 45 for permitting transfer or carriage of the pump 10.

The pump frame 28 may be regarded as a member supporting the pump body 22, and the carrying handle 47 and casters (wheels) 48 may be regarded as members provided on the pump body 22.

Figure 1:
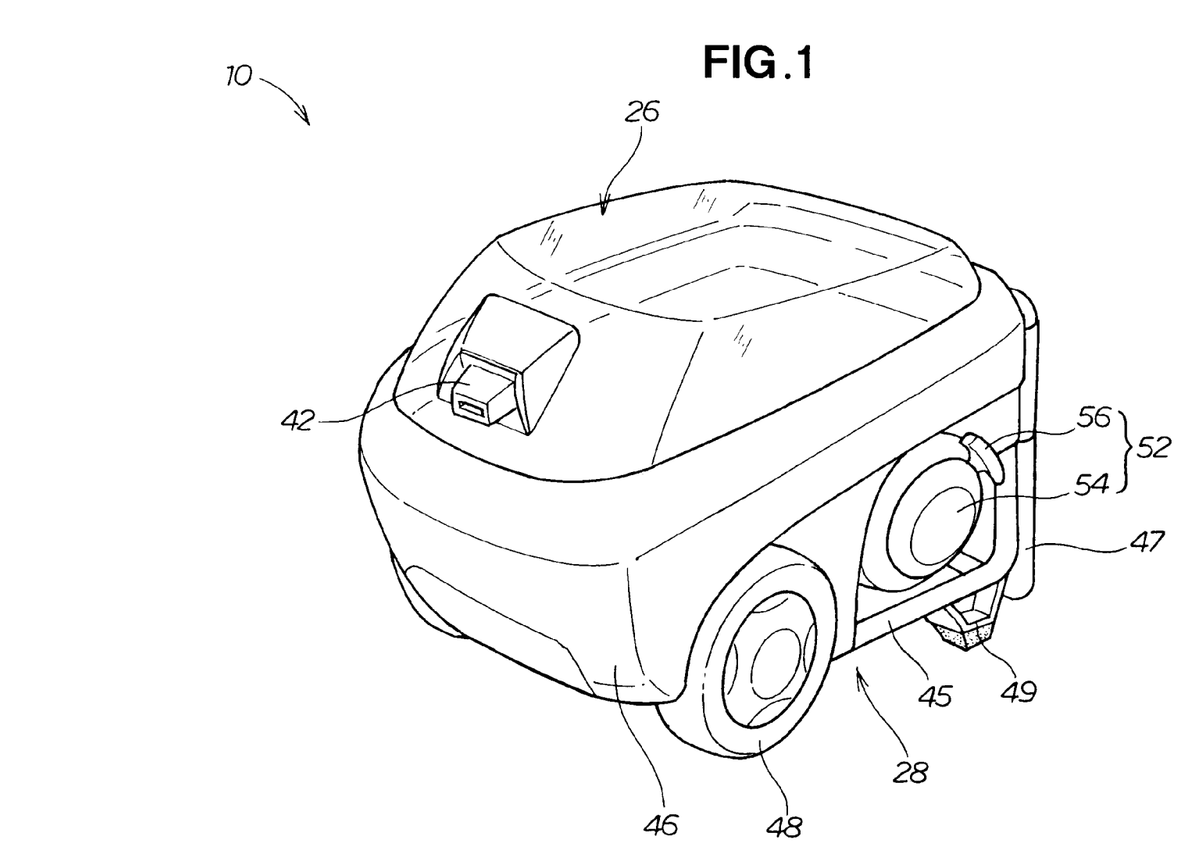
FIG. 1 is a perspective view showing a pump according to an embodiment of the present invention.
Figure 2:
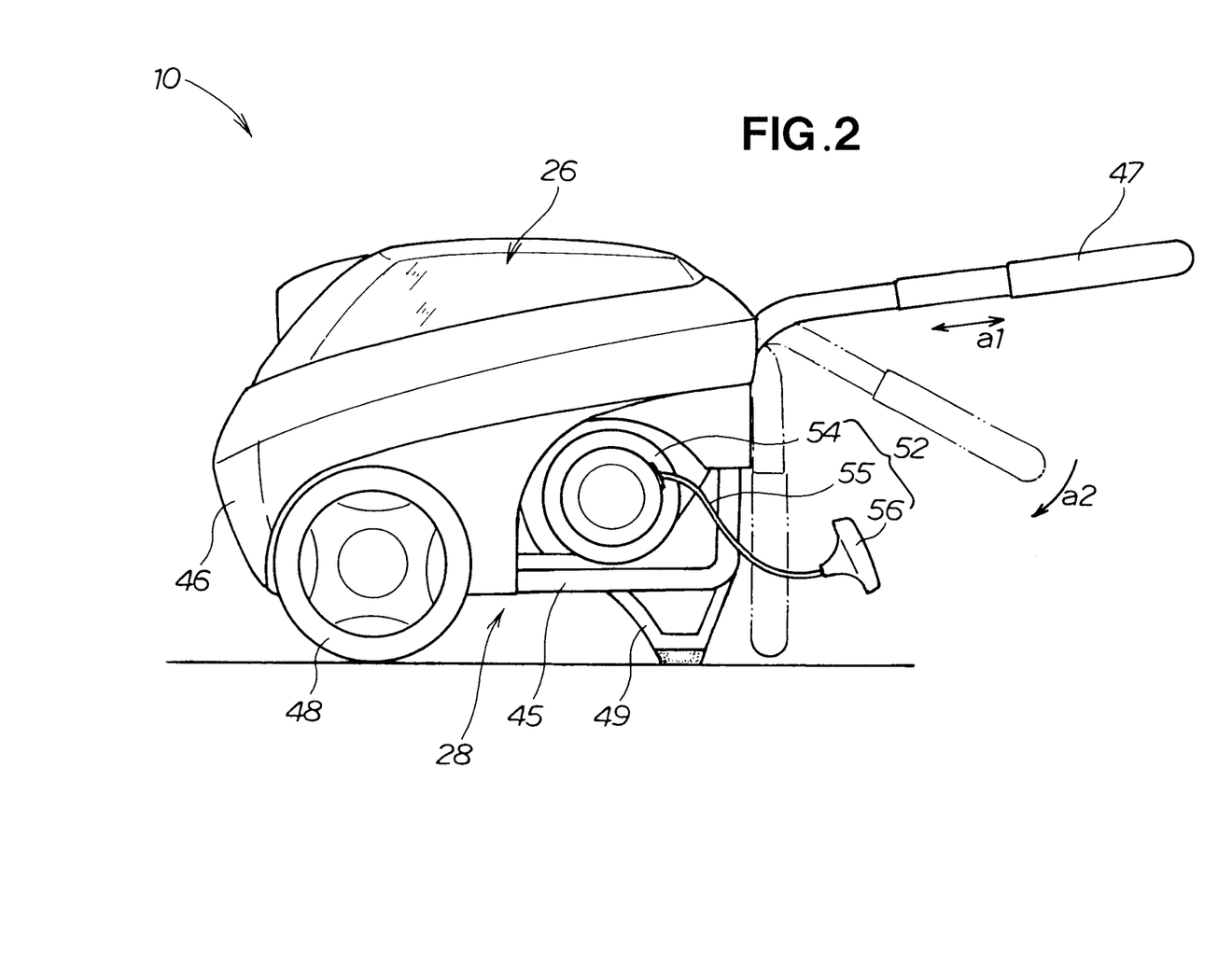
FIG. 2 is a side view of the pump shown in FIG. 1.
Figure 3:
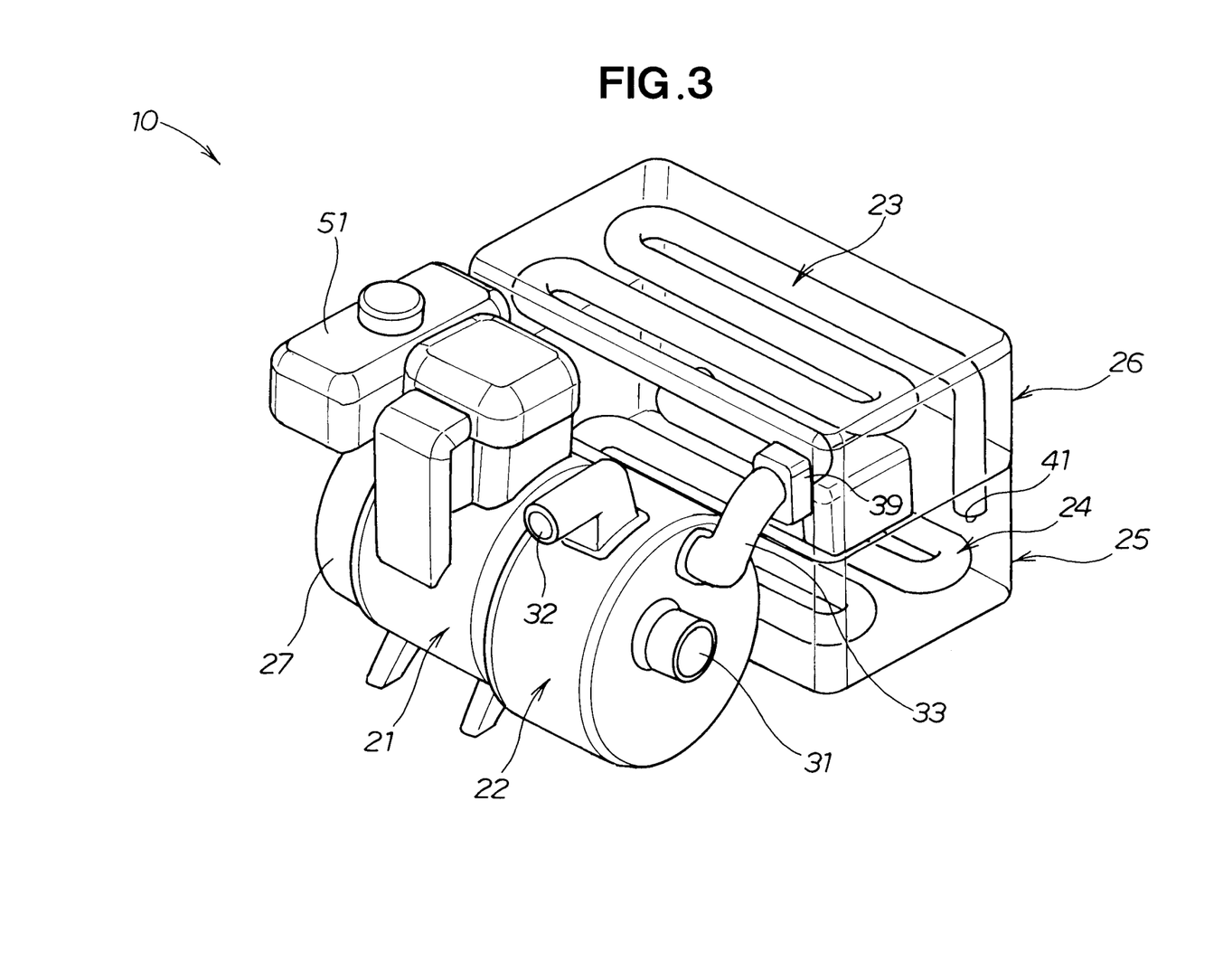
FIG. 3 is a perspective view showing the interior of the pump of FIG. 1 as viewed from a pump body.
Figure 4:
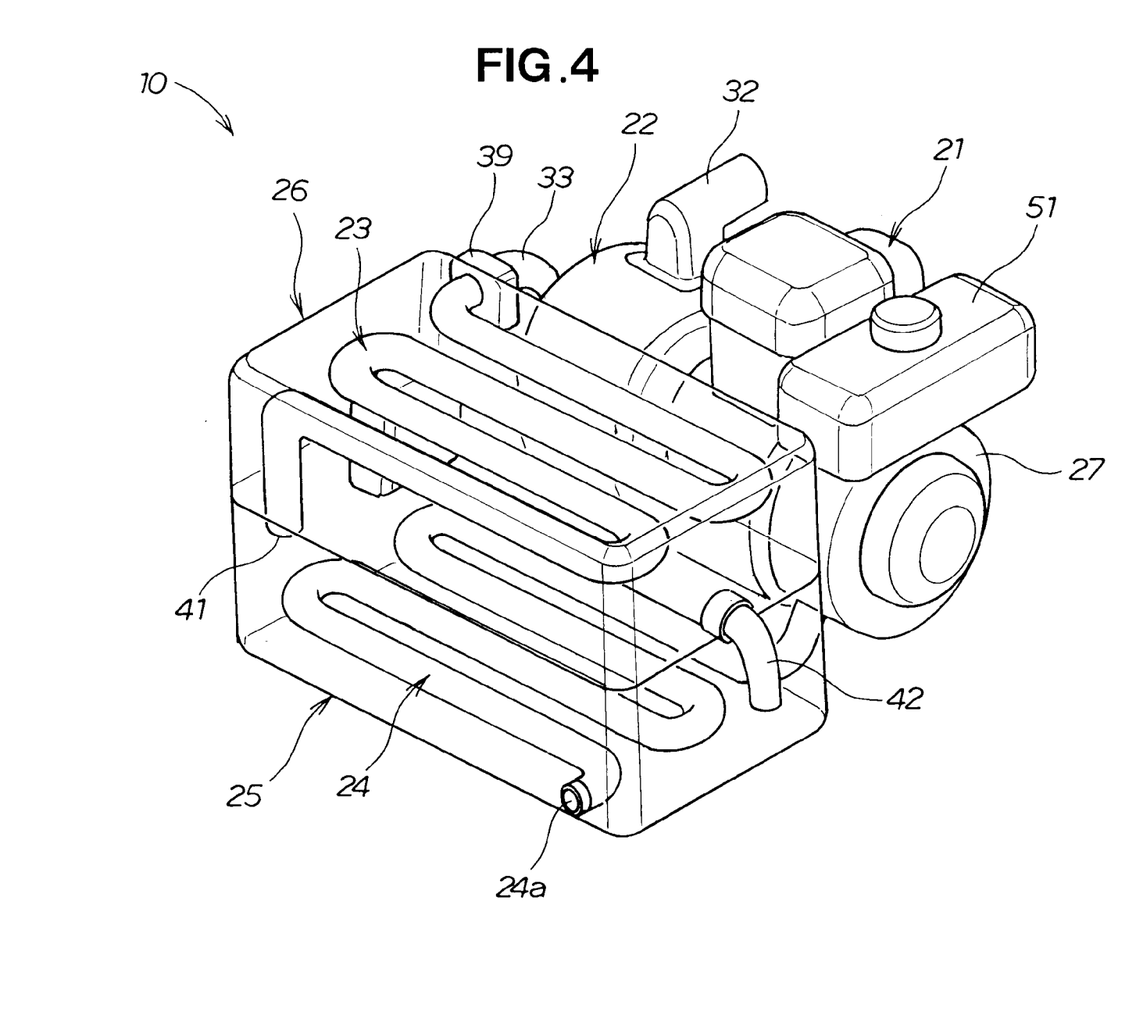
FIG. 4 is a perspective view showing the interior of the pump of FIG. 1, as seen from first and second tanks.

The carrying handle 47 is a telescopic handle that is not only expandable and contractable (collapsible) as indicated by arrow a1 in FIG. 2 but also pivotable toward and away from the pump frame 28 as indicated by arrow a2 in FIG. 2.

The engine 21 includes a fuel tank 51 (FIG. 4) for storing a fuel, a recoil starter 52 for activating the engine 21, and the exhaust pipe 24. The exhaust pipe 24 is accommodated folded (i.e., in a folded configuration) in the first tank 25, and has an exhaust outlet 24a projecting out of the first tank 25.

The recoil starter 52 includes a rope 55 wound on a starter body 54, and an operating knob 56 operable by a human operator for pulling the rope 55.

As illustrated in FIG. 5, the pump body 22 and the vacuum pump 27 are driven by the same engine 21. Raw water is taken in or introduced from outside the pump 10 through the raw water inlet 31 of the pump body 22. The introduced raw water is discharged through the raw water ejection outlet 32. A part of the raw water is adjusted via the flow rate adjusting valve 39 and then flows into the branch pipe 23. The branch pipe 23 extends through the second tank 26 in such a manner that the raw water supply opening 41 provided at the distal end of the branch pipe 23 opens into the first tank 25, so that a part of the raw water is supplied to the first tank 25. The first tank 25 is depressurized by the vacuum pump 27 so that the raw water can be vaporized even at low temperature. The vapor thus produced in the first tank 25 is delivered via the communication pipe 36 to the second tank 26. Then, the vapor is condensed into distilled water 61 in the second tank 26, so that the distilled water 61 is accumulated for use as drinking water.

With reference to FIG. 6, the following describe in greater detail vaporization of raw water in the first tank 25 and condensation of vapor in the second tank 26.

In the first tank 25, the exhaust pipe 24 is accommodated folded (in a folded configuration) and used as a heat source for vaporizing raw water. Raw water is supplied to the first tank 25 through the raw water supply opening 41 of the branch pipe 23 as indicated by arrow b1. The thus-supplied raw water contacts the exhaust pipe 24 where high-temperature exhaust gas flows as indicated by arrow b2, so that the raw water is vaporized.

Figure 7:
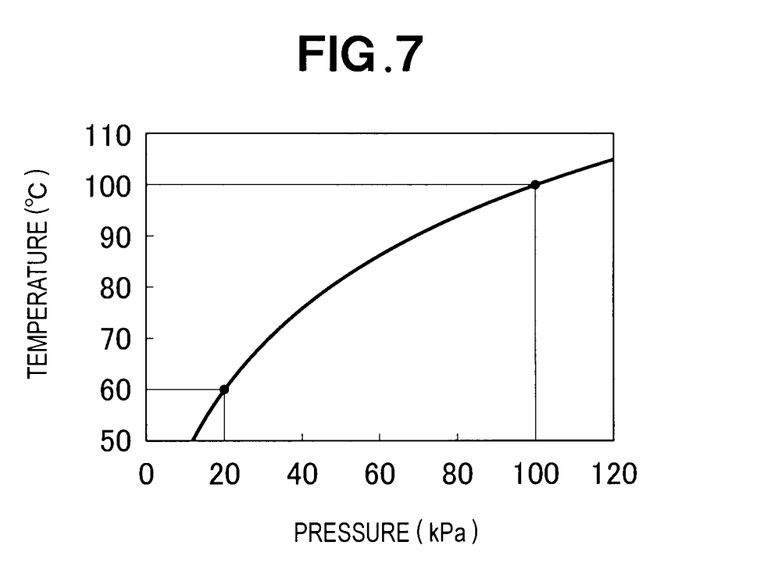
FIG. 7 is a graph showing a relationship between pressure within the first tank and boiling point of raw water.

By the first tank 25 being depressurized by the vacuum pump 27, raw water can be evaporated even when the temperature of the exhaust pipe 24 is 60° C., as seen from FIG. 7. Namely, raw water can be evaporated with a less amount of heat. Thus, in the illustrated example, the first tank 25 is depressurized to 20 kPa.

FIG. 7 illustrates a curve of boiling points with the horizontal axis representing the pressure (kPa) and the vertical axis representing the temperature (° C.). In the illustrated example, the boiling point (i.e., temperature at which water vaporizes) is 100° C. at one atmospheric pressure (100 kPa). Generally, the boiling point of liquid (raw water) falls as the pressure falls; for example, water boils at about 86° C. at the top of Mt. Fuji.

High-temperature vapor goes up, via the communication pipe 36, to the second tank 26 as indicated by arrows b3 to b5. During that time, the vapor having contacted the cooling fins 37 as indicated by arrows b6 and b7 is converted back into water droplets and returned to the first tank 25. Namely, the cooling fins 37 function to adjust an amount of vapor to be produced in the first tank 25.

Because low-temperature raw water is flowing through the branch pipe 23 in the second tank 26 as indicated by arrow b8, the vapor having contacted the branch pipe 23 is cooled into water droplets and accumulated as distilled water 61 on the bottom 26a of the second tank 26. Such distilled water 61 can be used as drinking water.

The pump 10 constructed in the aforementioned manner can provide drinking water everywhere as long as there are a source of water and a fuel. Further, because the pump 10 can produce distilled water 61 using exhaust heat of the engine 21, it can achieve efficient use of energy.

Figure 8:
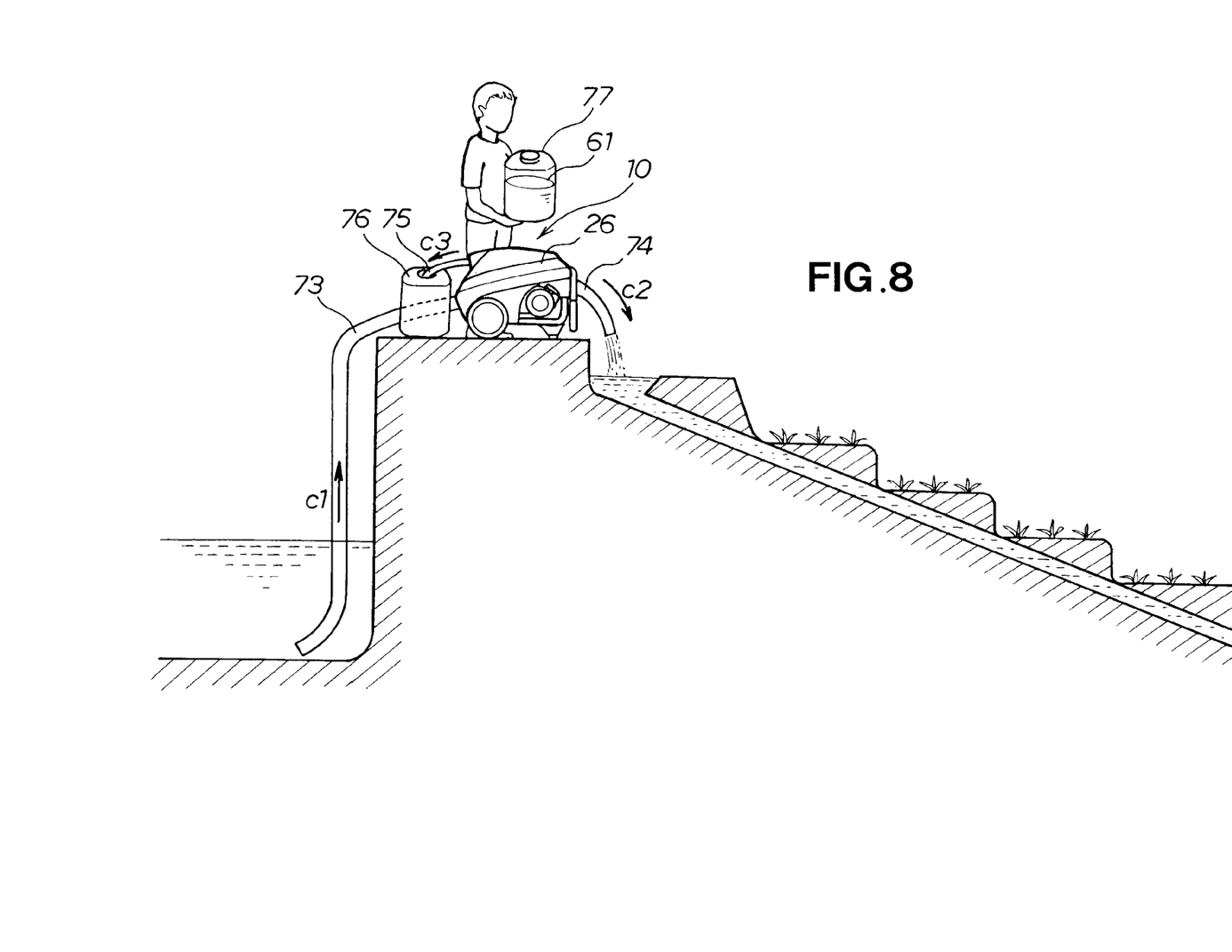
FIG. 8 is a view explanatory of example usage of the pump of FIG. 1.

Next, with reference to FIGS. 8 to 10, a description will be given about example usage of the pump 10. Where water is to be supplied or irrigated from a river to a field, as shown in FIG. 8, the water supply hose 73 is connected to the raw water inlet 31 in such a manner that the hose 73 hangs from the pump 10 down to the river, and the water discharge hose 74 is connected to the raw water ejection outlet 32 as necessary. In this way, raw water can be pumped up from the river as indicated by arrow c1 and supplied to the field as indicated by arrow c2.

Because the pump 10 has a distillation function capable of distilling raw water, drinking water can be accumulated in the second tank 26 during irrigation to the field. Namely, the pump 10 can simultaneously perform pumping up of raw water from a river or the like and production of distilled water 61. By the pump 10 producing drinking water simultaneously with irrigating water to a filed or the like, it is possible to reduce a water carrying load. In addition, the produced distilled water (drinking water) 61 can be transferred into another tank 76 as indicated by arrow c3, by a hose 75 being connected to the distilled water outlet (i.e., drinking water outlet) 42.

Figure 9:
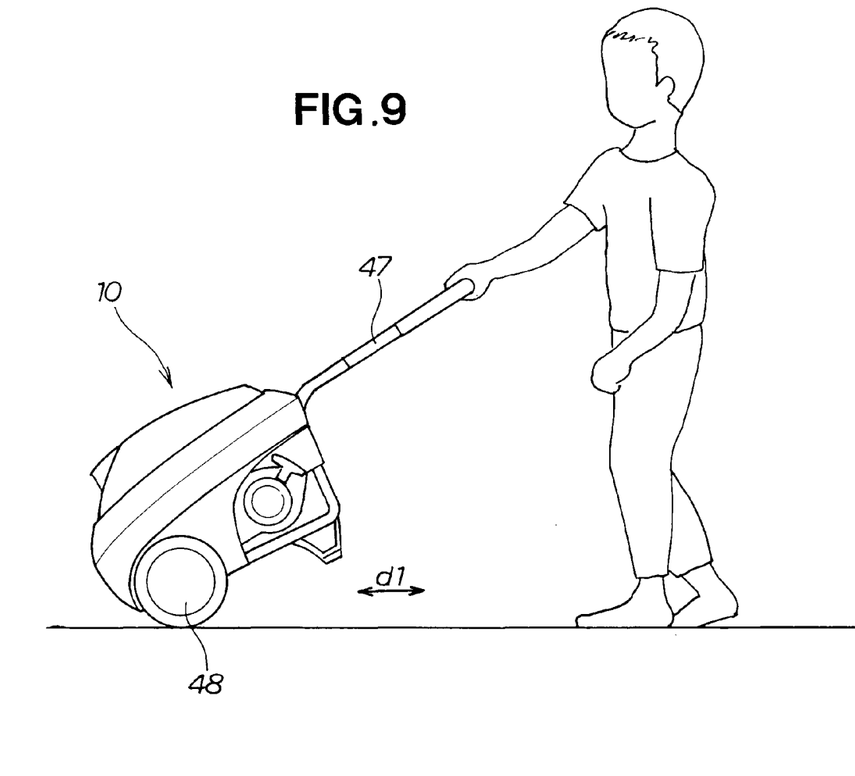
FIG. 9 is a view explanatory of a manner in which the pump of FIG. 1 is carried.

Because the pump 10 includes the carrying handle 47 and caster 48, it can be transferred or carried as indicated by arrow d1 together with the distilled water 61, as shown in FIG. 9. Although the distilled water 61 increases in weight as it increases in amount, the carrying handle 47 and caster 48 allow the distilled water 61 to be transferred with ease.

Figure 10:
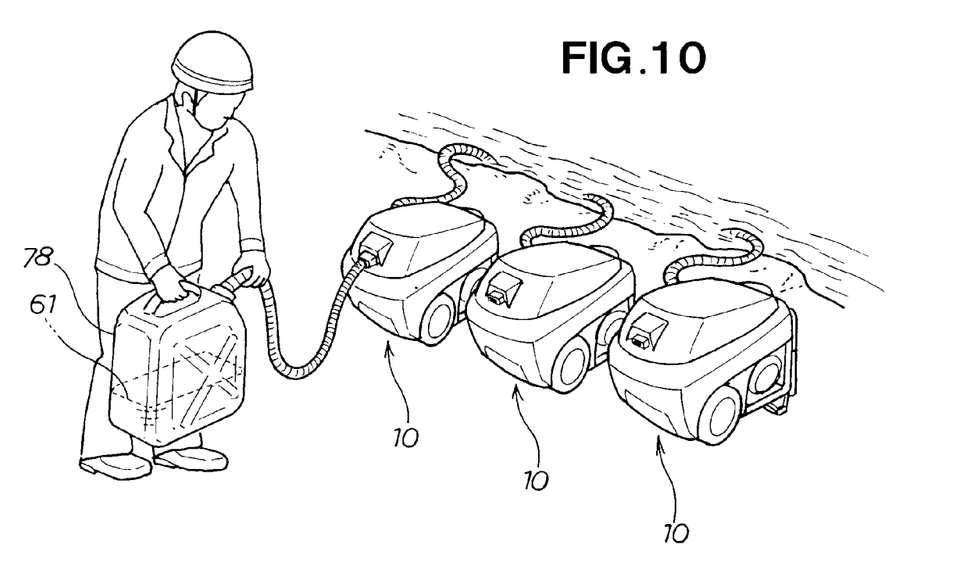
FIG. 10 is a view explanatory of example usage of the pump of FIG. 1 at the time of a disaster.

Further, at the time of a disaster (natural disaster), the pump 10 can mainly perform production of distilled water (drinking water) 61, as shown in FIG. 10. In such a case, a plurality of the pumps 10 may be used so that greater water discharging and distilling capabilities can be achieved even where each individual one of the pumps 10 is of a small size.

As described above, the pump 10 includes the engine 21 as a drive source; the pump body 22 to be driven by the engine 21, the raw water inlet 31 provided in the pump body 22 for introducing raw water from outside, and the raw water ejection outlet 32 for ejecting raw water. The pump 10 also includes the branch pipe 23 extending from the pump body 22 to branch a part of raw water, the first tank 25 which has the exhaust pipe 24 of the engine 21 accommodated therein and in which raw water supplied via the branch pipe 23 is evaporated by heat of the exhaust pipe 24, and the second tank 26 which is disposed immediately over and fixedly attached to the first tank 25, has the branch pipe 23 accommodated therein and condenses vapor, produced in the first tank 25, into water droplets, and the communication pipe 36 inter the first and second tanks 25 and 26 in communication with each other.

Namely, in the instant embodiment of the pump 10, a part of introduced raw water is supplied to the first tank 25 via the branch pipe 23 and evaporated by heat of the exhaust pipe 24 in the first tank 25. The resulting vapor is supplied from the first tank 25 to the second tank 26 via the communication pipe 36 and brought into contact with the branch pipe 23 to be cooled and condensed into water droplets, and the resulting water droplets are accumulated in the second tank 26.

In the aforementioned manner, the pump 10 can produce drinking water simultaneously with irrigating water from a river or the like to a field. As a result, the pump 10 can readily provide safe drinking water even in a developing country where drinking water is difficult to obtain. Further, at the time of a disaster, the pump 10 can readily provide drinking water.

Furthermore, because the cooling fins 37 for converting vapor, produced in the first tank 25, back to water droplets are provided within the communication pipe 36, it is possible to control the amount of vapor to be produced in the first tank 25.

Furthermore, in the pump 10, where the pump body 22 is provided with the vacuum pump 27 for depressurizing the interior of the first tank 25, the boiling point of water can be lowered by merely depressurizing the interior of the first tank 25. Thus, even when the exhaust pipe 24 as a heat source has not warmed up sufficiently, e.g. at the time of activation of the engine 21, the pump 10 can convert raw water into vapor. As a result, it is possible to achieve an enhanced convenience of the pump 10 having the distillation (water purification) function.

Furthermore, because the vacuum pump 27 is driven by the engine 21, no separate drive source is required for driving the vacuum pump 27. Thus, the pump 10 can be reduced in size and weight and hence in cost.

Furthermore, because the exhaust pipe 24 is accommodated folded in the first tank 25, it is possible to enhance the capability of the exhaust pipe 24 as the heat source for promoting evaporation of raw water.

Furthermore, because the branch pipe 23 is accommodated folded in the second tank 26, it is possible to enhance the capability of the branch pipe 23 as a cooling means (coolant) for condensing vapor produced in the first tank 25.

Furthermore, because the pump body 22 is supported by the pump frame 28 and the carrying handle 47 and casters 48 that permit transfer of the pump 10 are provided on the pump frame 28, the pump 10 can be readily transferred or carried together with drinking water. As a result, it is possible to achieve an even further enhanced convenience of the pump 10 having the distillation function.

Furthermore, because the carrying handle 47 is contractable or collapsible toward the pump body 22, the pump 10 itself can be stored compactly and efficiently, and thus, the pump 10 can be readily loaded onto a vehicle or the like.

Whereas the pump of the present invention has been described above in relation to the case where the second tank 26 is fixedly attached to the first tank 25, the present invention is not so limited, and the second tank 26 may be detachably attached to the first tank 25. In such a case, produced distilled water 61 accumulated in the second tank 26 can be carried separately from the first tank 25, and thus, it is possible to achieve an even further enhanced convenience of the pump 10.

Furthermore, the pump of the present invention has been described above in relation to the case where two cooling fins 37 for converting vapor, produced in the first tank 25, back to water droplets are provided within the communication pipe 36 as shown in FIG. 6. However, the number of such cooling fins 37 may be chosen as desired.

The basic principles of the present invention are well suited for application to portable pumps which include a carrying handle and casters.

What is claimed is:

1. A pump including an engine as a drive source, a pump body to be driven by the engine, a raw water inlet provided in the pump body for introducing raw water from outside, and a raw water ejection outlet provided in the pump body for ejecting raw water, the pump comprising:
    a branch pipe extending from the pump body for branching part of raw water introduced through the raw water inlet;
    a first tank having an exhaust pipe of the engine accommodated therein, the raw water supplied via the branch pipe being evaporated by heat of the exhaust pipe in the first tank;
    a second tank disposed over the first tank and having the branch pipe accommodated therein, vapor produced by evaporation of the raw water in the first tank being condensed into water droplets in the second tank; and
    a communication pipe interconnecting the first and second tanks in communication with each other.

2. The pump according to claim 1, which further comprises a cooling fin provided within the communication pipe for converting the vapor, produced in the first tank, back into water droplets.

3. The pump according to claim 1, which further comprises a vacuum pump provided on the pump body for depressurizing an interior of the first tank.

4. The pump according to claim 1, wherein the vacuum pump is driven by the engine.

5. The pump according to claim 1, wherein the exhaust pipe is accommodated folded in the first tank.

6. The pump according to claim 1, wherein the branch pipe is accommodated folded in the second tank.

7. The pump according to claim 1, wherein the pump body is supported by a pump frame, a carrying handle and casters that permit carrying of the pump being provided on the pump frame.

8. The pump according to claim 7, wherein the carrying handle is collapsible toward the pump body.

\* \* \* \* \*